US009320266B2

(12) United States Patent
Hui

(10) Patent No.: US 9,320,266 B2
(45) Date of Patent: Apr. 26, 2016

(54) BAIL SUPPORT MECHANISM FOR A SPINNING REEL

(71) Applicant: SHIMANO Components (Malaysia) SDN/BHD, Pontian, Johor (MY)

(72) Inventor: Chan Yik Hui, Johor (MY)

(73) Assignee: SHIMANO COMPONENTS (MALAYSIA) SDN. BHD., Johor (MY)

( * ) Notice: Subject to any disclaimer, the term of this patent is extended or adjusted under 35 U.S.C. 154(b) by 0 days.

(21) Appl. No.: 14/557,789

(22) Filed: Dec. 2, 2014

(65) Prior Publication Data

US 2015/0250156 A1    Sep. 10, 2015

(30) Foreign Application Priority Data

Mar. 4, 2014   (JP) .................................. 2014-41508

(51) Int. Cl.
    *A01K 89/01*    (2006.01)
(52) U.S. Cl.
    CPC ........... *A01K 89/01* (2013.01); *A01K 89/01082* (2015.05)
(58) Field of Classification Search
    CPC ......................... A01K 89/01; A01K 89/01082
    See application file for complete search history.

(56) References Cited

U.S. PATENT DOCUMENTS

| 4,426,045 A * | 1/1984 | Gifford ................. A01K 89/01 242/232 |
| 4,513,926 A * | 4/1985 | Tsunoda ............ A01K 89/0108 242/231 |
| 4,923,140 A * | 5/1990 | Yamaguchi ............ A01K 89/01 242/230 |
| 5,346,157 A * | 9/1994 | Kaneko .............. A01K 89/0108 242/232 |
| 5,601,244 A * | 2/1997 | Kawabe ................. A01K 89/01 242/232 |
| 5,820,052 A * | 10/1998 | Yamaguchi ............ A01K 89/01 242/232 |
| 5,820,053 A * | 10/1998 | Takeuchi ........... A01K 89/0108 242/231 |
| 6,050,511 A * | 4/2000 | Katayama .......... A01K 89/0108 188/267.1 |
| 6,382,542 B1 * | 5/2002 | Sato ....................... A01K 89/01 242/232 |
| 2001/0032901 A1 * | 10/2001 | Sato ....................... A01K 89/00 242/232 |
| 2002/0056776 A1 * | 5/2002 | Sugawara .......... A01K 89/0108 242/231 |
| 2003/0146319 A1 * | 8/2003 | Iwabuchi ........... A01K 89/0108 242/231 |
| 2005/0082405 A1 * | 4/2005 | Sugawara .............. A01K 89/01 242/223 |

FOREIGN PATENT DOCUMENTS

JP    2003-189767 A    7/2003

* cited by examiner

*Primary Examiner* — Emmanuel M Marcelo
(74) *Attorney, Agent, or Firm* — Global IP Counselors

(57) ABSTRACT

A bail support mechanism includes a first bail support member, a striking member, a spring member, and an abutting surface. The abutting surface includes a first portion, a second portion, a stepped portion, and a sliding portion. The first portion is a portion that the striking member abuts when in the line guiding position. The second portion is a portion that the striking member abuts when in the line releasing position. The stepped portion is disposed between the first portion and the second portion. The sliding portion extends continuously from the first portion to the apex.

6 Claims, 6 Drawing Sheets

BAIL SUPPORT MECHANISM FOR A SPINNING REEL

CROSS-REFERENCE TO RELATED APPLICATIONS

This application claims priority to Japanese Patent Application 2014-41508 filed in Japan on Mar. 4, 2014, the contents of which are hereby incorporated herein by reference.

BACKGROUND

1. Field of the Invention

The present invention relates to a bail support mechanism for a spinning reel.

2. Background Information

Generally, a spinning reel comprises a bail support mechanism for supporting the bail. The bail support mechanism comprises a bail support member, a striking member, and a biasing member. The bail support member is a member for supporting the bail and is pivotably attached to a rotor arm. The bail support member can be pivoted between a line guiding position and a line releasing position.

When the bail support member is pivoted between the line guiding position and the line releasing position, the striking member slides on the abutting surface disposed on the bail support member. The striking member is mounted to the rotor arm and is biased toward the abutting surface by the biasing member. The abutting surface comprises a protrusion midway in the path on which the striking member slides. For this reason, when the bail support member switches to the line guiding position or the line releasing position, the striking member will strike the abutting surface after going over the protrusion and will generate a clicking sound. The user can recognize that the bail support member has been switched to the line guiding position or to the line releasing position due to this clicking sound (refer to Japanese Laid-Open Patent Application No. 2003-189767).

SUMMARY

It has been found that there is a possibility that the striking member will be caught on the protrusion that generates the clicking sound. As a result, smoothly sliding the striking member may not be achieved, which can lead to the problem that the sliding of the bail support member will also not be smoothly accomplished.

The object of the present invention is to enable smooth pivoting of the bail support member.

The bail support member according to the present invention is a bail support mechanism that pivotably supports a bad of a spinning reel on the rotor between a line guiding position and a line releasing position. The bad support mechanism comprises a bail support member, a striking member, a biasing member, and an abutting surface. The bail support member supports the bail. The bad support member is pivotably supported on the rotor between a line guiding position and a line releasing position. The striking member is disposed on either the rotor or the bail support member. The biasing member biases the striking member toward the other of the rotor or the bail support member. The abutting surface is disposed on the other of the rotor or the bail support member. The abutting surface comprises a first portion, a second portion, a stepped portion, and a sliding portion. The first portion is a portion that the striking member abuts when in the line guiding position. The second portion is a portion that the striking member abuts when in the line releasing position. The stepped portion is disposed between the first portion and the second portion. The sliding portion extends continuously between the first portion and the apex of the stepped portion.

In the bail support mechanism according to the present invention, the sliding portion extends continuously between the first portion and the apex of the stepped portion. Accordingly, there is no portion on the abutting surface where the striking member can get caught, between where the bail support member pivots from the line guiding position to the line releasing position, that is, between where the striking member slides from the first portion to the second portion. As a result, pivoting the bail support member can be smoothly carried out.

Preferably, the sliding portion is inclined so as to approach the other of the rotor or the bail support member while approaching the stepped portion. According to this configuration, it is possible to gradually contract the biasing member.

The sliding portion may be curved and inclined or linearly inclined in the biasing direction of the biasing member.

Preferably, the inclination angle of the sliding portion is greater than or equal to 2 degrees and is less than or equal to 5 degrees.

Preferably, the apex has a flat portion that extends in the pivoting direction.

Preferably, the bail support mechanism further comprises a toggle mechanism for allocating and biasing the bail support member to the line guiding position and the line releasing position.

According to the present invention, pivoting the bail support member can be smoothly carried out.

BRIEF DESCRIPTION OF THE DRAWINGS

Referring now to the attached drawings which form a part of this original disclosure.

DETAILED DESCRIPTION OF EMBODIMENTS

Figure 1:
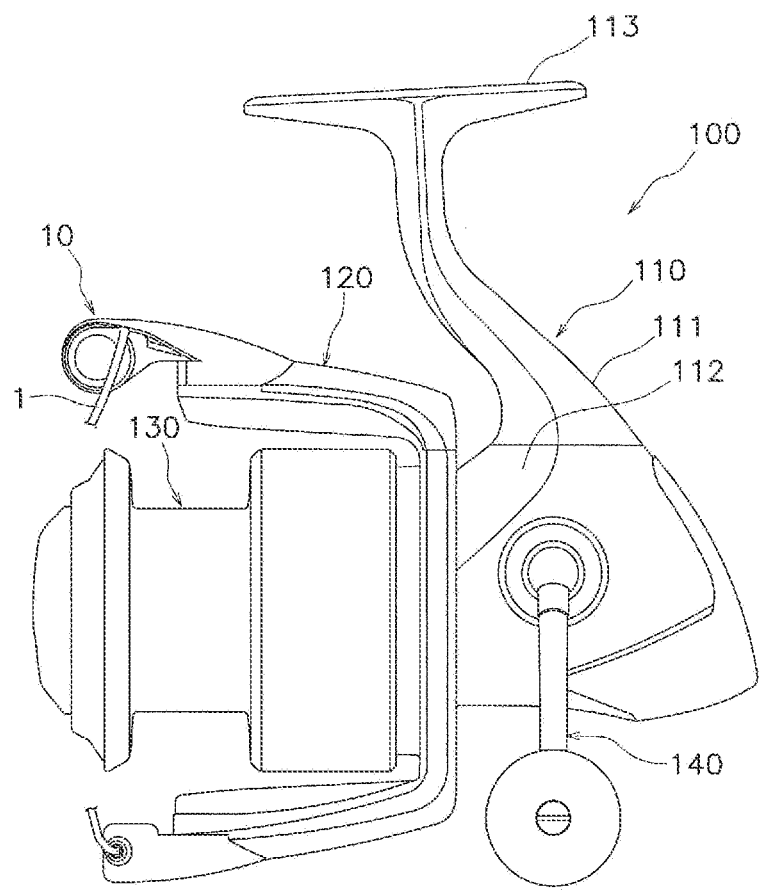
FIG. 1 is a side view of a spinning reel.
Figure 2:
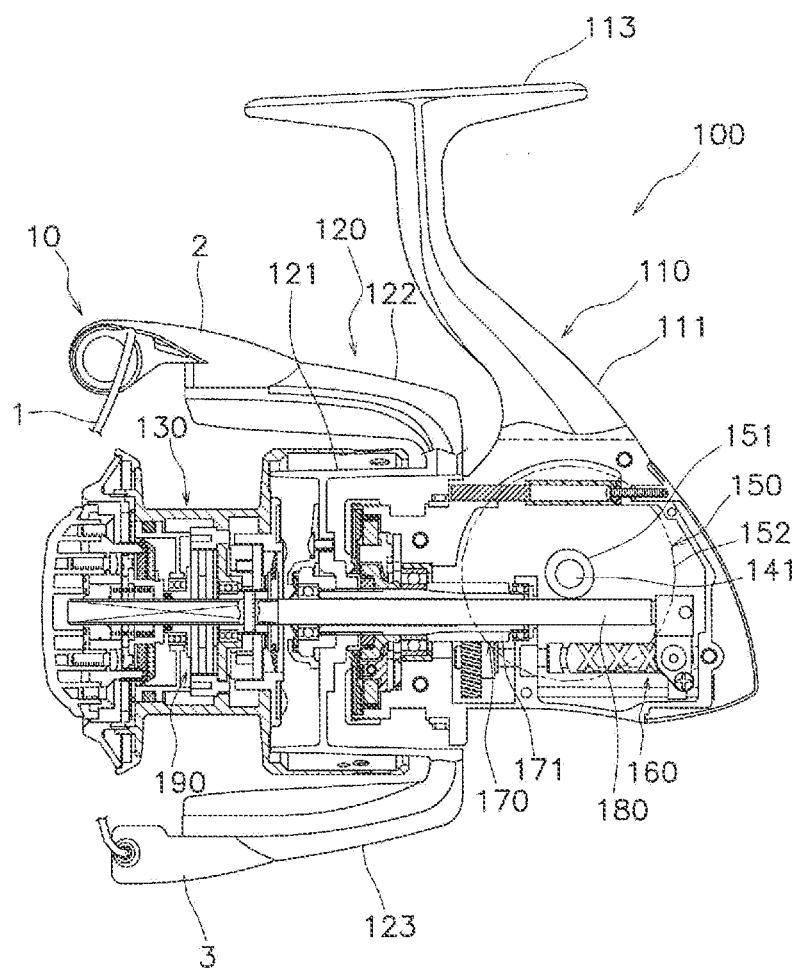
FIG. 2 is a cross-sectional view of a spinning reel.

An embodiment of the bail support mechanism according to the present invention is explained below, with reference to the drawings. FIG. 1 is a side view of a spinning reel, and FIG. 2 is a cross-sectional view of the spinning reel. In the following description, "front" indicates the direction in which the line unreels; specifically, the left in FIG. 1 and FIG. 2 is the "front."

As shown in FIG. 1, the spinning reel 100 unreels (or casts) fishing line in a forward direction. The spinning reel 100 comprises a bail support mechanism 10, a reel body 110, a rotor 120, a spool 130, and a handle 140. As shown in FIG. 2, the spinning reel 100 further comprises a drive mechanism 150, an oscillating mechanism 160, a pinion gear 170, and a spool shaft 180.

As shown in FIG. 1, the reel body 110 comprises a case part 111 and a lid portion 112. The lid portion 112 can be detached from the case part 111. Additionally, the case part 111 comprises a mounting portion 113 that extends in the longitudinal direction. The mounting portion 113 is a portion that is mounted to the fishing rod.

As shown in FIG. 2, the reel body 110 comprises an internal space that is defined by the case part 111 and the lid portion 112 and that houses various mechanisms in the internal space. In particular, the drive mechanism 150 and the oscillating mechanism 160 are housed in the reel body 110.

The drive mechanism 150 comprises a drive shaft 151 and a drive gear 152. The drive shaft 151 is coupled with a handle shaft 141 and is integrally rotated with the handle shaft 141.

The drive gear 152 is coupled with the drive shaft 151 and is integrally rotated with the drive shaft 151. The drive gear 152 is a face gear that meshes with the gear portion 171 of the pinion gear 170. The drive shaft 151 and the drive gear 152 are rotated by rotating the handle 140 that is mounted to the side surface of the reel body 110; this also rotates the pinion gear 170.

The spool shaft 180 is disposed on the reel body 110. In particular, the spool shaft 180 extends forward from inside of the reel body 110. The spool shaft 180 reciprocally moves in the longitudinal direction by rotating the handle 140. In particular, the rotation of the handle 140 rotates the pinion gear 170 via the drive gear 152. Accompanying the rotation of this pinion gear 170, the oscillating mechanism 160 reciprocally moves the spool shaft 180 in the longitudinal direction.

The spool 130 is a member to which the fishing line is wound. The spool 130 is mounted to the distal end portion of the spool shaft 180 via a drag mechanism 190. The spool 130 integrally and reciprocally moves with the spool shaft 180 in the longitudinal direction.

The pinion gear 170 is disposed on the reel body 110. In particular, the pinion gear 170 extends forward from inside of the reel body 110. The pinion gear 170 is rotatably disposed around the spool shaft 180. The pinion gear 170 is formed in a tubular shape, and the spool shaft 180 extends inside of the pinion gear 170. The pinion gear 170 is supported by the reel body 110 via a plurality of axle bearing members.

The rotor 120 is a member for winding the fishing line to the spool 130. The rotor 120 is fixed to the front portion of the pinion gear 170 and is integrally rotated with the pinion gear 170. Therefore, the rotor 120 is non-rotatable relative to the pinion gear 170.

The rotor 120 comprises a rotor body 121 and first and second rotor arms 122 and 123. The rotor body 121 has a cylindrical shape. The first and second rotor arms 122 and 123 extend from the outer peripheral surface of the rotor body 121 toward the front. The first rotor arm 122 and the second rotor arm 123 are disposed in opposite positions in the circumferential direction of the rotor body 121.

Figure 3:
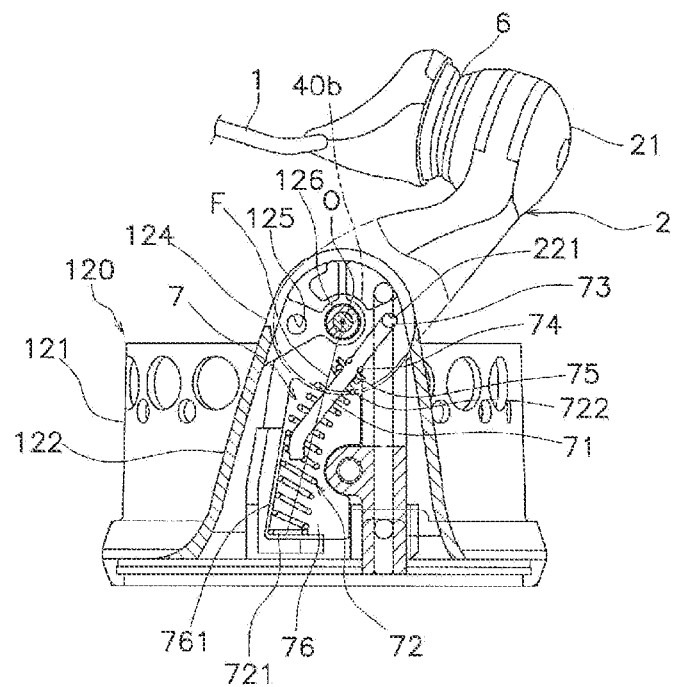
FIG. 3 is a cross-sectional view of the first rotor arm.
Figure 4:
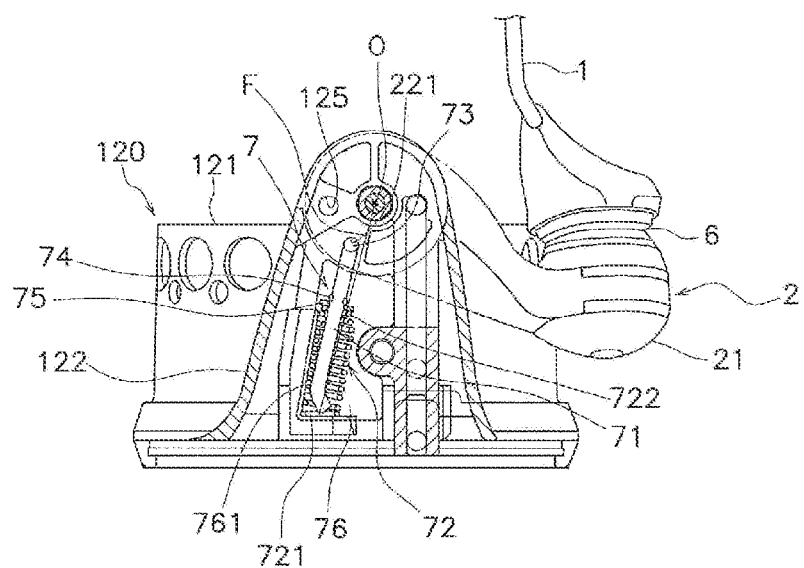
FIG. 4 is a cross-sectional view of the first rotor arm.

As shown in FIG. 3 and FIG. 4, a mounting hole 125, a boss portion 126 and the like are formed on the distal end portion 124 of the first rotor arm 122. A striking member 4 mentioned below is mounted to the mounting hole 125. A first bail support member 2 mentioned below is pivotably mounted to the boss portion 126.

As shown in FIG. 2, the bail support mechanism 10 is a mechanism for supporting the bail 1. The bail support mechanism 10 comprises a first bail support member 2 and a second bail support member 3. The first bail support member 2 can correspond to the bail support member of the present invention. The second bail support member 3 is pivotably mounted to the distal end portion of the second rotor arm 123. The bail 1 is a member that is substantially curved in a U-shape and that extends between the first bail support member 2 and the second bail support member 3.

Figure 5:
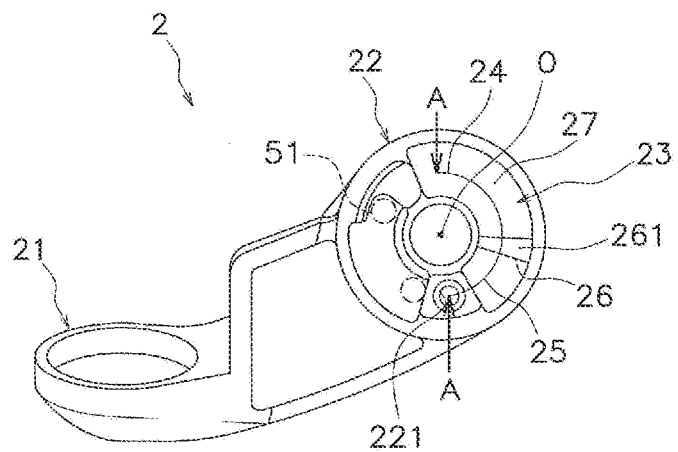
FIG. 5 is a bottom surface view of the first bail support member.

FIG. 5 is a bottom surface view of the first bail support member 2. As shown in FIG. 5, the first bail support member 2 comprises a distal end portion 21 and a proximal end portion 22. A line roller 6 mentioned below and the like are attached to the distal end portion 21. The proximal end portion 22 is a portion that is pivotably attached to the distal end portion 124 of the first rotor arm 122. The first bail support member 2 comprises an abutting surface 23. The abutting surface 23 is formed in the proximal end portion 22. An engagement hole 221 is formed in the proximal end portion 22. A first end portion 73 of a rod 71 mentioned below engages with the engagement hole 221.

As shown in FIG. 3 and FIG. 4, the first bail support member 2 is pivotably mounted to the first rotor arm 122. In particular, the first bail support member 2 is attached to the boss portion 126 of the first rotor arm 122 using a bolt or the like. The first bail support member 2 is pivotable between a line guiding position (FIG. 3) and a line releasing position (FIG. 4).

Figure 6:
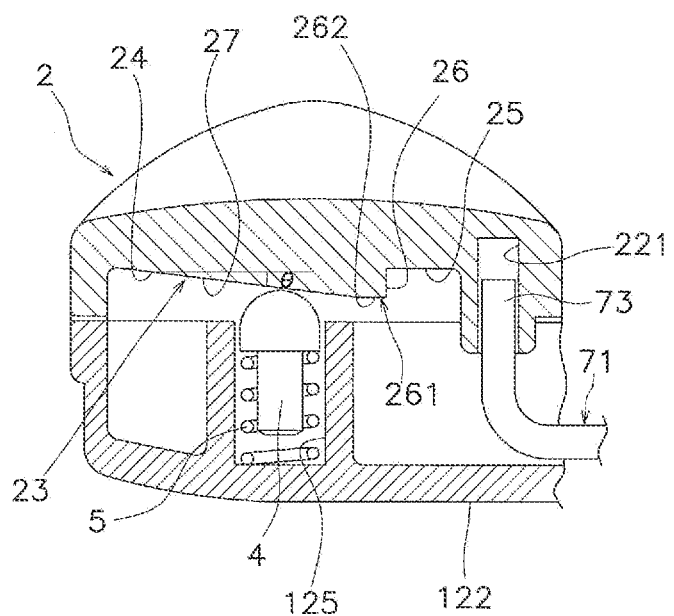
FIG. 6 is a cross-sectional view along the A-A line in FIG. 5.

FIG. 6 is a cross-section diagram along the A-A line in FIG. 5. As shown in FIG. 6, the bail support mechanism 10 further comprises a striking member 4 and a spring member 5. The spring member 5 can correspond to the biasing member of the present invention.

The distal end portion of the striking member 4 abuts the abutting surface 23. In particular, the striking member 4 is biased toward the abutting surface 23 by the spring member 5. The direction in which the striking member 4 is biased shall be the first direction. The striking member 4 and the spring member 5 are mounted to the mounting hole 125 of the first rotor arm 122. The striking member 4 is movable in a direction approaching and separating from the abutting surface 23 inside of the mounting hole 125. The distal end portion of the striking member 4 has a smooth, curved surface and specifically is semi-spherical.

With the first bail support member 2 pivoting between the line guiding position and the line releasing position, the distal end portion of the striking member 4 slides on the abutting surface 23. Specifically, as shown in FIG. 5, the striking member 4 slides on the abutting surface 23 along an arc having a pivot axis O as the center. The pivot axis O is the pivot center when the first bail support member 2 is pivoted.

As shown in FIG. 5, the abutting surface 23 comprises a first portion 24, a second portion 25, a stepped portion 26, and a sliding portion 27. The first portion 24 is a portion that the striking member 4 abuts when in the line guiding position, that is, when the first bail support member 2 is in the state shown in FIG. 3. The second portion 25 is a portion that the striking member 4 abuts when in the line releasing position, that is, when the first bail support member 2 is in the state shown in FIG. 4.

As shown in FIG. 6, the apex 261 of the stepped portion 26 is positioned between the first portion 24 and the second portion 25. In particular, the apex 261 of the stepped portion 26 is positioned on an arc that connects the first portion 24 and the second portion 25 and that has the pivot axis O as the center. The apex 261 of the stepped portion 26 comprises a flat portion 262 that extends in the arcuate direction, that is, extends in the pivoting direction. In the present embodiment, the apex 261 of the stepped portion 26 is positioned closest in the biasing direction to the rotor 120 of the abutting surface 23. In particular, the apex 261 of the stepped portion 26 is positioned closest in the biasing direction to the first rotor arm 122 of the abutting surface 23. The biasing direction indicates the direction in which the spring member 5 is biased, that is, the vertical direction in FIG. 6.

The sliding portion 27 extends continuously from the first portion 24 to the apex 261. That is, the sliding portion 27 does not comprise a stepped portion midway and is includes a smooth surface. The sliding portion 27 is inclined so as to approach the rotor 120 (a first rotor arm 122) in the biasing direction while approaching the stepped portion 26. More specifically, the sliding portion 27 is linearly inclined in the biasing direction. The inclination angle θ of the sliding portion 27 is not particularly limited and can be, for example, greater than or equal to two degrees and less than or equal to five degrees. The inclination angle is the angle formed between the sliding portion 27 and a surface of the first bail support member 2 that is horizontal in the pivoting direction.

The second portion 25, the first portion 24, and the apex 261 are disposed in that order toward a second direction, which is the direction opposite from the first direction in which the spring member 5 is biased. Accordingly, when the first bail support member 2 pivots from the line guiding position to the line releasing position, the striking member 4 strikes the abutting surface 23 in the vicinity beyond the stepped portion 26 and is able to make a clicking sound.

As shown in FIG. 3, the bail support mechanism 10 further comprises a line roller 6 and a toggle mechanism 7. The line roller 6 is a member that guides the fishing line to the spool 130. The line roller 6 is rotatably mounted to the distal end portion 21 of the first bail support member 2.

The toggle mechanism 7 is a mechanism that allocates and biases the first bail support member 2 to the line guiding position and the line releasing position.

The toggle mechanism 7 is disposed in the first rotor arm 122, as shown in FIG. 3. The toggle mechanism 7 comprises a rod 71 and a coil spring 72. The first end portion 73 of the rod 71 is engaged with the first bail support member 2.

As shown in FIG. 6, the first end portion 73 of the rod 71 is bent toward the first bail support member 2 in order to be engaged with the engagement hole 221 of the first bail support member 2. As shown in FIG. 3, the rod 71 comprises an engagement protrusion 74 in the middle portion. A washer 75 is mounted to the engagement protrusion 74. The distal end portion of the coil spring 72 abuts the washer 75. Accordingly, force is evenly transmitted from the distal end portion of the coil spring 72 to the rod 71.

The coil spring 72 biases the rod 71, and is guided by a guide sheet 76. The guide sheet 76 comprises a wall surface portion 761. The wall surface portion 761 is bent so as to engage the proximal end portion 721 of the coil spring 72 and to guide one side surface of the coil spring 72. Additionally, the wall surface portion 761 has a height that enables the side portion and the proximal end portion of the coil spring 72 to be supported.

The distal end portion 722 of the coil spring 72 has a smaller winding diameter than the other portions. Consequently, a large gap is formed between the coil spring 72 and the rod 71 in portions besides the distal end portion 722; as a result, the coil spring 72 is less likely to deform even if the rod 71 changes positions inside of the coil spring 72.

With the toggle mechanism 7 configured in this manner, the direction in which the first bail support member 2 is biased differs between when in the line guiding position and when in the line releasing position. In other words, as shown in FIG. 3, when the first bail support member 2 is in the line guiding position, the toggle mechanism 7 biases the first bail support member 2 in the direction of the line guiding position. That is, the toggle mechanism 7 biases the first bail support member 2 counterclockwise about the pivot axis O in FIG. 3. Accordingly, the first bail support member 2 is maintained in the line guiding position.

On the other hand, as shown in FIG. 4, when the first bail support member 2 is in the line releasing position, the toggle mechanism 7 biases the first bail support member 2 in the direction of the line releasing position. In other words, the toggle mechanism 7 biases the first bail support member 2 clockwise about the pivot axis O in FIG. 3. Accordingly, the first bail support member 2 is maintained in the line releasing position.

In the operation of the first bail support member pivoting between the line guiding position and the line releasing position, the position in which the coil spring 72 contracts the most is the dead point of the toggle mechanism 7. Specifically, the dead point of the toggle mechanism 7 is the position in which the first end portion 73 of the rod 71 overlaps with a straight line F. The straight line F is a straight line that connects the pivot axis O and the center position of the proximal end portion 721 of the coil spring 72. The toggle mechanism 7 is able to allocate and bias the first bail support member 2 to the line guiding position and the line releasing position about the dead point, which can be held in both the line guiding position and the line releasing position.

The bail support mechanism 10 according to the present embodiment has the following characteristics.

In the bail support mechanism 10, the sliding portion 27 extends continuously between the first portion 24 and the apex 261 of the stepped portion 26. For this reason, there is no portion on the abutting surface 23 where the striking member 4 can get caught, between where the first bail support member 2 pivots from the line guiding position to the line releasing position, that is, between where the striking member 4 slides from the first portion 24 to the second portion 25. As a result, smoothly pivoting the first bail support member 2 can be carried out.

Although each embodiment of the present invention has been presented heretofore, the present invention is not limited to the embodiments, and various modifications can be made without departing from the scope of the invention Modified Example 1

Figure 7:
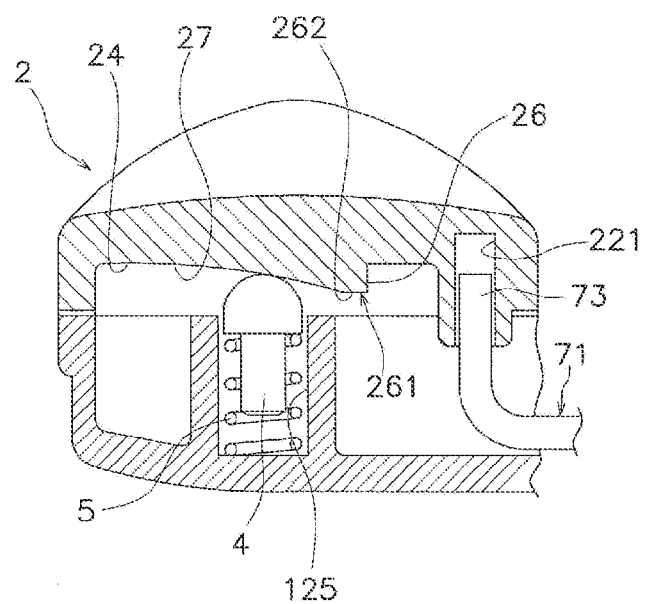
FIG. 7 is a cross-sectional view according to the first modified example.

The sliding portion 27 needs only to extend continuously between the first portion 24 and the apex 261 and does not need to be linearly inclined as described above. For example, as shown in FIG. 7, the sliding portion 27 may be inclined in a curve in the biasing direction. Additionally, the sliding portion 27 does not need to be inclined in the biasing direction. In other words, the first portion 24 and the apex 261 may be in substantially the same position in the biasing direction.

Modified Example 2

Figure 8:
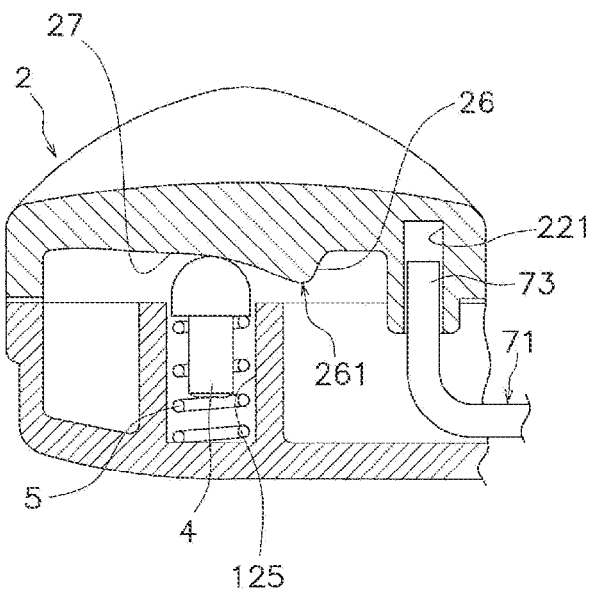
FIG. 8 is a cross-sectional view according to the second modified example.

In the above-described embodiment, the stepped portion 26 extends linearly along the biasing direction; however, the stepped portion is not particularly limited to this configuration. For example, as shown in FIG. 8, the stepped portion 26 may extend along the biasing direction in a curved shape.

Modified Example 3

Figure 9:
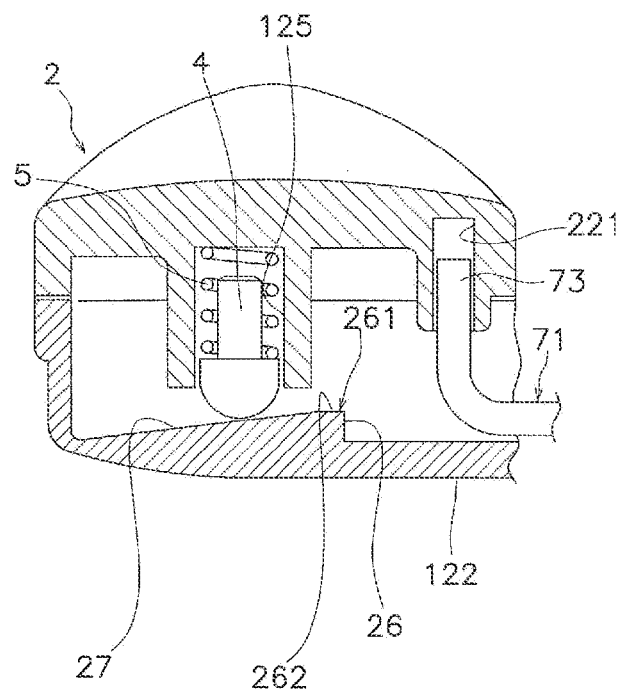
FIG. 9 is a cross-sectional view according to the third modified example.

In the above-described embodiment, the abutting surface 23 is disposed on the first bail support member 2; however, the abutting surface is not particularly limited to this. For example, as shown in FIG. 9, the abutting surface 23 may be disposed on the rotor 120. In particular, the abutting surface 23 may be disposed on the first rotor arm 122. In this case, the striking member 4 is disposed on the first bail support member 2. In particular, the mounting hole 125 is formed in the first bail support member 2. Then, the spring member 5 biases the striking member 4 toward the first rotor arm 122.

Modified Example 4

Figure 10:
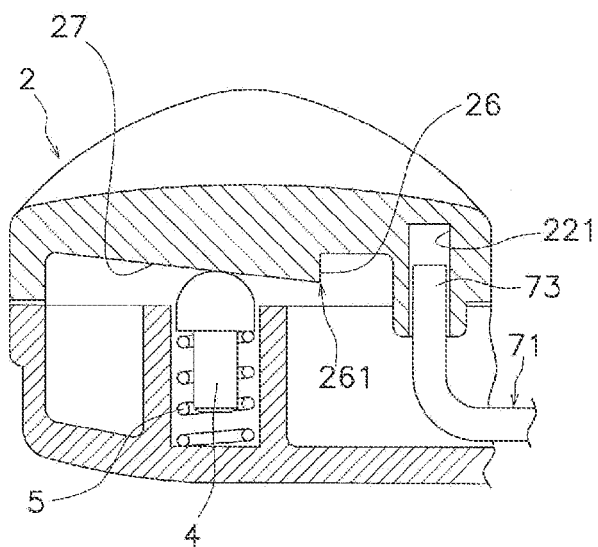
FIG. 10 is a cross-sectional view according to the fourth modified example.

In the above-described embodiment, the apex 261 of the stepped portion 26 comprises a flat portion 262; however, as shown in FIG. 10, the apex 261 of the stepped portion 26 does not need to comprise a flat portion.

What is claimed is:

1. A bail support mechanism for a spinning reel, the spinning reel including a bail pivotably supported on a rotor between a line guiding position and a line releasing position, the bail support mechanism comprising:
    a bail support member supporting the bail and being pivotably supported on the rotor between the line guiding position and the line releasing position;
    a striking member disposed on one of the rotor and the bail support member;
    a biasing member configured to bias the striking member toward the other of the rotor or the bail support member; and
    an abutting surface disposed on the other of the rotor or the bail support member, the abutting surface including
    a first portion, the striking member configured to abut the first portion when the bail is in the line guiding position,
    a second portion, the striking member configured to abut the second portion when the bail is in the line releasing position,
    a stepped portion having an apex and being disposed between the first portion and the second portion, and
    a sliding portion continuously extending between the first portion and the apex of the stepped portion, the sliding portion being curved and inclined in a biasing direction of the biasing member.

2. The bail support mechanism for the spinning reel recited in claim 1, wherein
    the sliding portion is inclined so as to approach the other of the rotor or the bail support member while approaching the stepped portion.

3. The bail support mechanism for the spinning reel recited in claim 2, wherein
    the sliding portion is linearly inclined in a biasing direction of the biasing member.

4. The bail support mechanism for the spinning reel recited in claim 3, wherein
    the sliding portion forms an inclination angle that is greater than or equal to 2 degrees and is less than or equal to 5 degrees.

5. The bail support mechanism for the spinning reel recited in claim 1, wherein
    the apex has a flat portion extending in a pivoting direction of the bail.

6. The bail support mechanism of a spinning reel recited in claim 1, further comprising
    a toggle mechanism configured to allocate and to bias the bail support member to the line guiding position and the line releasing position.

* * * * *